(12) United States Patent
Premani

(10) Patent No.: US 10,896,621 B2
(45) Date of Patent: Jan. 19, 2021

(54) EDUCATIONAL ROBOT

(71) Applicant: Farid Premani, Sugar Land, TX (US)

(72) Inventor: Farid Premani, Sugar Land, TX (US)

( * ) Notice: Subject to any disclaimer, the term of this patent is extended or adjusted under 35 U.S.C. 154(b) by 0 days.

(21) Appl. No.: 16/577,646

(22) Filed: Sep. 20, 2019

(65) Prior Publication Data
US 2020/0013304 A1     Jan. 9, 2020

Related U.S. Application Data

(60) Provisional application No. 62/884,581, filed on Aug. 8, 2019.

(51) Int. Cl.
*G09B 5/06* (2006.01)
*B25J 11/00* (2006.01)

(52) U.S. Cl.
CPC ............ *G09B 5/065* (2013.01); *B25J 11/001* (2013.01); *B25J 11/0015* (2013.01)

(58) Field of Classification Search
CPC . G09B 5/00; G09B 5/065; G09B 7/00; G09B 7/02; G09B 7/04; B25J 11/001; B25J 11/0015
See application file for complete search history.

(56) References Cited

U.S. PATENT DOCUMENTS

| | | | | |
|---|---|---|---|---|
| 3,841,020 | A * | 10/1974 | Ryan | A63H 3/31 446/190 |
| 8,228,299 | B1 * | 7/2012 | Maloney | G06Q 20/14 345/173 |
| 2009/0098792 | A1 * | 4/2009 | Cheng | A63H 3/365 446/219 |
| 2014/0162230 | A1 * | 6/2014 | Akopian | G09B 23/32 434/256 |
| 2016/0158659 | A1 * | 6/2016 | Pradhan | A63H 13/005 446/175 |
| 2019/0118104 | A1 * | 4/2019 | Su | G06F 3/0393 |
| 2019/0366558 | A1 * | 12/2019 | Gupta | B25J 13/006 |

* cited by examiner

*Primary Examiner* — Timothy A Musselman
(74) *Attorney, Agent, or Firm* — Barry Choobin; Patent 360

(57) ABSTRACT

The present invention relates to an educational robot that includes a body which forms the main portion of the robot. The educational robot also includes a head mounted on the body which is capable of making human facial expressions. In addition, the educational robot includes a plurality of limbs that are capable of making human perceptible gesture. Further, the educational robot includes an interface housed in the body and allows the user to interact with the interface. In an example, the interface allows the user to select a multimedia content from a library of multimedia content. The educational robot includes an imaging device to capture an image of the user to identify the user. Further, the educational robot renders the multimedia content in an interactive and intuitive way.

4 Claims, 3 Drawing Sheets

EDUCATIONAL ROBOT

TECHNICAL FIELD

The present invention relates to an educational remote and more particularly relates to robots used in child education.

BACKGROUND OF THE INVENTION

Robots, depending on their utility, are employed in different classes of industry. One such industry in which robots have been increasingly becoming popular is the educational industry. Robots are generally being used in both home and classrooms to help students in their learning. They can also allow a remote connection between a teacher and students, wherein the teacher can communicate through a robot.

Although the robots increasingly being used in education, there have been many drawbacks in known commercial robots. For instance, the robots do not provide intuitive interaction between a student and a robot. Moreover, robots are perceived as mere machines and are unable to attract the attention of the students.

SUMMARY

This summary is not intended to identify essential features of the claimed subject matter nor is it intended for use in determining or limiting the scope of the claimed subject matter.

The present invention aims to alleviate the problems associated with the conventional robots used in the field of education. The present invention relates to an educational robot which is capable interaction with a user in a such a way that the interaction is humanly and user-intuitive.

Thus, the principal objective of the present invention is directed to an educational robot that is humanly and user-intuitive.

Another objective of the present invention is that the robot has multi-functional capabilities to cater to the education needs of a student.

Yet another objective of the present invention is that the robot has entertainment capabilities for the entertainment of the student.

In one aspect, the educational robot includes a body which forms the main portion of the robot. The educational robot also includes a head portion mounted on the body which is capable of making facial expressions. Also, the educational robot includes a plurality of limbs that are capable of making human perceptible gestures. Further, the educational robot includes an interface housed in the body and allows the user to interact with the robot. In an example, the interface is a computing device with touch input that allows a user to select multimedia content from a library of multimedia content. The educational robot is provided with a feature to deliver the creative learning lessons. Furthermore, the educational robot includes a camera to capture an image of the user to identify the user. Further, the educational robot renders the multimedia content interactively and intuitively.

The educational robot of the present invention makes human perceptible gestures thereby making the interaction with the user intuitive and human-friendly. Moreover, the educational robot of the present invention identifies the user and renders the multimedia content based on the identity of the user. As a result, the educational robot can render multimedia content based on the user.

BRIEF DESCRIPTION OF DRAWINGS

The features, aspects, and advantages of the subject matter will be better understood with regard to the following description, and accompanying figures. The use of the same reference number in different figures indicates similar or identical features and components.

DETAILED DESCRIPTION

The above-mentioned implementations are further described herein with reference to the accompanying figures. It should be noted that the description and figures relate to exemplary implementations, and should not be construed as a limitation to the present subject matter. It is also to be understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

Figure 1:
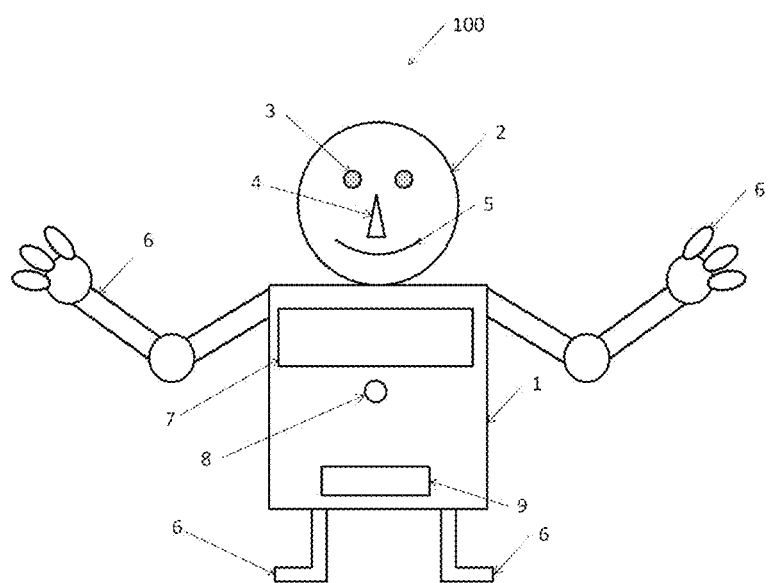
FIG. 1 illustrates a schematic diagram of an educational robot, in accordance with an exemplary embodiment of the present invention.

FIG. 1 illustrates a schematic diagram of an educational robot 100, in accordance with an embodiment of the present invention. The educational robot can be humanoid in appearance and resembles a human body and some physical actions of the human body. Furthermore, educational robot 100 can be used to render multimedia content to a user. Moreover, the educational robot 100 is capable of interacting with the user by making facial expressions and human perceptible gestures so that the interaction with the user is intuitive and communicative. The robot can communicate with students, teachers, and parents The educational robot includes a body 1 that is a major portion of the educational robot 100. The body 1 houses various components of the educational robot 100. The educational robot 100 also includes a head 2 that is mounted on the body 1. The head 2 is mounted on the top the body 1 and shape and features of the head 2 are configured like a human. The head 2 is shown to have a pair of eyes 3, a nose 4, and lips 5. The head 2 is capable of making human facial expressions. In one example, each of the pair of eyes 3, a nose 4, and lips 5 can be actuated selectively to present the human facial expressions. In one example, the eyes 3, the nose 4, and mouth 5 may be coupled to actuators, such as a pneumatic, electromagnetic, or hydraulic actuator to impart motion to them.

In one aspect, the educational robot 100 includes a plurality of limbs 6 that configured as arms and legs of the educational robot 100. For instance, the limbs include a pair of arms and a pair of legs that can be selectively actuated to make human perceptible gestures. In one example, the limbs 6 may be coupled to actuators, such as a pneumatic, electromagnetic, or hydraulic actuator to impart motion to them. It is known that robot comprises many parts operably connected to motors such as servo motor for imparting motion to the robot. The pair of legs are coupled to wheels that allow the robot 100 to move on the floor. The components of the robot can be powered by a battery, for example, a lithium-ion battery. The battery is preferably a rechargeable battery and a separate adaptor can be provided for recharging the battery.

The educational robot 100 also includes an interface 7 coupled to the upper front portion of the body 1. The interface 7 can be a touchscreen display which is mounted on a chest portion of the body 1. The interface 7 allows the user to interact with the robot and the multimedia contents stored in the memory of the robot 100. Alternatively, the user may also request the multimedia content through an app that can be connected to the robot 100 by wired/wireless network. In operation, interface 7 may provide a list of the multimedia contents to the user for the user to make the selection. In one example, interface 7 also allows the user to take a test that the teacher has prepared. The interface 7 can be an LCD screen with a touch interface for input from the user. The LCD screen displays the multimedia content, list, selection and other contents to the user. Moreover, the user can play educational games through the interface 7.

The educational robot 100 includes a camera 8 which captures an image of the user. The camera 8 can either be housed in the body 1 or it can be housed on the head portion 2. In either implementation, camera is positioned in such a way that the imaging device captures the image of the user. The educational robot 100 also includes a processor 9 which is operably coupled to all other components of the educational robot 100 for controlling the different components. The processor 9 can be a single processing unit or several units, all of which could include multiple computing units. The processor 9 may be implemented as one or more microprocessors, microcomputers, microcontrollers, digital signal processors, central processing units, state machines, logic circuitries, and/or any devices that manipulate signals, based on operational instructions. The processor 9 also includes a storage device/memory that stores multimedia content. In operation, the processor controls the operation of the educational robot 100. For instance, the processor 9 controls the actuation of the head portion 2, the limbs 6, and the interface 7, and the imaging device 8.

In one example, processor 9 through the camera captures an image of the user and using one or more facial recognition algorithms, identify the user. Based on the user, the robot behaves as programmed to interact with students, parent or teacher. The processor 9 identifies the user to provide customized multimedia content. For instance, processor 9 may provide different multimedia content to teachers and different multimedia content to the students. Such recognition can be performed by any known facial recognition technique. Also, the processor 9 controls the actuation of the limbs 6 and the head portion 2 to make gestures which, in one example, are in accordance with the present invention. For instance, the processor 9 controls the interface 7 to render a video of a rhyme for children and simultaneously, controls the limbs to make gestures to perform an act corresponding to the verse of the rhyme, for example dancing. Such an act makes learning effective for children. Also, based on the multimedia content, the educational robot 100 may move its limbs 6 to present a dance form.

The educational robot 100 also houses a printer 13 positioned under the screen to print multimedia content for the user. In one example, the printer 13 can be colored printer capable of printing content in colored format. Further, the printer can hold up to 100 paper thereby making the printer self-sufficient.

Figure 2:
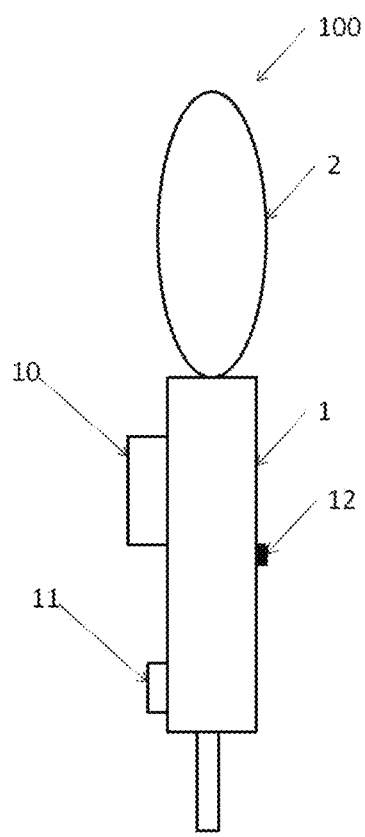
FIG. 2 a side view of the educational robot, in accordance with an exemplary embodiment of the present invention.

The educational robot 100 includes other components that are shown in FIG. 2. FIG. 2 a side view of the educational robot 100, in accordance with one implementation of the present invention. In the illustrated implementation, the educational robot 100 includes a projection device 10 positioned at the back of the body 2 and is configured to project the multimedia content on a screen. Further, the projection device 10 may have a 1080p resolution and can project the multimedia content on the screen of size up to 100 inches. In the illustrated example, the projection device 10 projects the image in such a way that the educational robot 100 does not fall in the line of sight of the user.

In one implementation, the education robot 100 includes a speaker 11 that may be audio-based multimedia content. The speaker 11 may be a high bass speaker with volume control to adjust an amplitude of the sound outputted by the speaker. Moreover, the speaker can be configured to play a welcome tone every time the education robot 100 is booted. For instance, the speaker 11 may play "Myself Captain Robo and I just came from ROBO Planet traveling 1 trillion miles to meet you, How are you doing today? Good! so are you ready to learn new activities with me today?"

Moreover, the educational robot 100 has a microphone 12 that can record voice from the user. The combination of the microphone 12 and the speaker 11 allows oral communication between the educational robot 100 and the user. Such combination is useful when the educational robot 100 is providing communication between kids in the classroom and the teacher at the remote location. The educational robot 100 is well equipped in providing the teaching assistance in home schooling.

In one implementation, the educational robot 100 is a specialized Early Childhood Development (ECD) robot designed for kids between 0-8 years aged.

Figure 3:
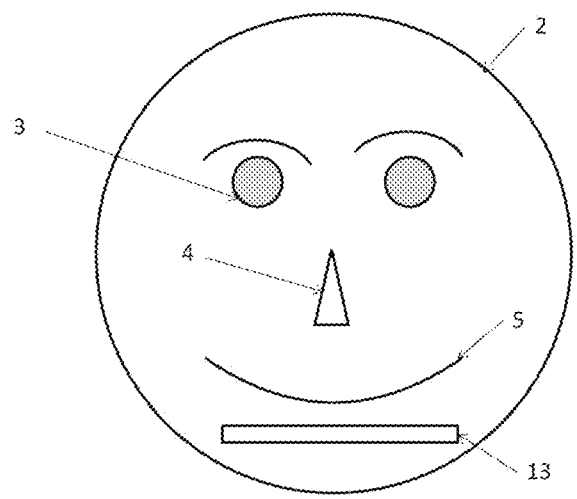
FIG. 3 illustrates the head portion, in accordance with an exemplary embodiment of the present invention.

FIG. 3 illustrates the head portion 2, in accordance with one implementation of the present invention. As mentioned before, the head portion 2 includes a pair of eyes 3, a nose 4, and a mouth 5. Further, the pair of eyes are made to resemble human eyes. Furthermore, each eye includes a light-emitting diode (LED) that can emit light of different colors, such that each color corresponds to an expression of emotion and projector bulb back of head for creating multimedia presentation to be used in classroom. For instance, in a questionnaire session with the students, the color green of the LED indicates a correct answer, color red indicate incorrect answer, and color blue indicates a mode of thinking.

In addition, each eye is surrounded by a pair of eyelashes that can be operated by the processor 9 to move relative to the eye. Such movement is required to produce facial expression, such as raising the eyes, etc. As may be understood, such movement is controlled by the processor 9.

In the present implementation, the mouth 5 can be selectively actuated by the processor 9 to mimic talking gesture of the educational robot 100. For instance, the mouth 5 can be made to perform lisping when an audio clip of a rhyme or a story is played. Such motion imparts the attention of the kids.

Although the invention has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present invention as defined.

I claim:

1. An educational robot comprising:
   a body;
   a head operably coupled on top the body, the head comprises a pair of eyes, a pair of eyelashes adjacent to the pair of eyes, a nose, and a pair of lips, and wherein each of the pair of eyes is selectively actuatable to render human facial expressions, the pair of eyelashes configured to actuate relative to the pair of eyes, the nose selectively actuatable to render human facial expressions, and the pair of lips is selectively actuatable to mimic a rhyme, wherein the pair of eyes include light-emitting diodes (LEDs) to emit light of different colors;

a plurality of limbs operably coupled to the body, wherein the plurality of limbs makes human perceptible gestures;

a touchscreen display mounted on a chest portion of the body to allow a user to interact with the educational robot, wherein the touchscreen display is configured to receive a selection of a multimedia content from a list of multimedia content by the user, the touchscreen display presents information to the user;

a storage device comprises plurality of multimedia content;

a network communication member for communicating with a cloud server for downloading the multimedia content;

an imaging device to capture an image of the user;

a projection device to project the multimedia content on a screen;

an imaging device to receive the captured image to identify the user; and a processor in electronic communication with different components of the education robot for controlling the education robot, the processor configured to:

identify the identification of the user and behaves as programmed, conduct a questionnaire session by presenting a multimedia presentation through the projection device and giving a plurality of responses through the pair of eyes, wherein a green color of the LEDs indicates a correct answer, a red color of the LEDs indicate a wrong answer, and a blue color of the LEDs indicates thinking.

2. The educational robot as claimed in claim 1 further comprising a microphone and a speaker to allow oral communication between the user and the processor.

3. The educational robot as claimed in claim 1 further comprising a printer housed in the body and beneath the screen.

4. The educational robot as claimed in claim 1, wherein the plurality of limbs includes a pair of legs and a pair of arms, and wherein each limb of the plurality of limbs is selectively actuable to make the human perceptible gesture.

* * * * *